(12) United States Patent
Lee et al.

(10) Patent No.: US 9,635,607 B2
(45) Date of Patent: Apr. 25, 2017

(54) METHOD AND TERMINAL FOR PERFORMING UP-LINK TRANSMISSION AT REDUCED POWER

(71) Applicant: LG ELECTRONICS INC., Seoul (KR)

(72) Inventors: Sangwook Lee, Seoul (KR); Jinyup Hwang, Seoul (KR); Manyoung Jung, Seoul (KR); Yoonoh Yang, Seoul (KR); Suhwan Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/416,572

(22) PCT Filed: Aug. 2, 2013

(86) PCT No.: PCT/KR2013/006978
§ 371 (c)(1),
(2) Date: Jan. 22, 2015

(87) PCT Pub. No.: WO2014/027775
PCT Pub. Date: Feb. 20, 2014

(65) Prior Publication Data
US 2015/0181517 A1    Jun. 25, 2015

Related U.S. Application Data

(60) Provisional application No. 61/682,325, filed on Aug. 13, 2012, provisional application No. 61/857,225, filed on Jul. 22, 2013.

(51) Int. Cl.
*H04W 52/24* (2009.01)
*H04W 52/02* (2009.01)
*H04W 52/14* (2009.01)

(52) U.S. Cl.
CPC ..... *H04W 52/0206* (2013.01); *H04W 52/146* (2013.01); *H04W 52/248* (2013.01); *Y02B 60/50* (2013.01)

(58) Field of Classification Search
CPC ........... H04W 52/0206; H04W 52/248; H04W 52/146; Y02B 60/50
See application file for complete search history.

(56) References Cited

U.S. PATENT DOCUMENTS 8,942,195 B2 * 1/2015 Liu ...................... H04W 72/10
370/329
9,036,731 B2 * 5/2015 Youtz ................... H04B 1/0475
375/295

(Continued)

FOREIGN PATENT DOCUMENTS

KR    10-2011-0050329 A    5/2011
KR    10-2012-0010255 A    2/2012
KR    10-2012-0040196 A    4/2012

*Primary Examiner* — Raj Jain
*Assistant Examiner* — Chuong M Nguyen
(74) *Attorney, Agent, or Firm* — Birch, Stewart, Kolasch & Birch, LLP

(57) ABSTRACT

The present disclosure provides a method of performing up-link transmission at a reduced power. According to the method, system information may be received from a base station. The system information may include one or more of first information on an operating band and second information on an up-link bandwidth. Also, according to the method, a network signal for an additional power reduction may be received from the base station. Also, according to the method, when an operating band indicated by the first information is within a range of 777 MHz to 787 MHz and a bandwidth indicated by the second information is 5 MHz, namely, 777 MHz to 782 MHz, an additionally required power reduction may be determined in order to decrease interference to the band of an adjacently located public (Continued)

safety network according to the network signal, and up-link transmission at the reduced power may be performed.

10 Claims, 22 Drawing Sheets

(56) References Cited

U.S. PATENT DOCUMENTS

| | | |
|---|---|---|
| 2010/0322090 A1 | 12/2010 | Zhang et al. |
| 2011/0081936 A1 | 4/2011 | Haim et al. |
| 2011/0319120 A1 | 12/2011 | Chen et al. |
| 2012/0044898 A1 | 2/2012 | Ishii |
| 2012/0231834 A1 | 9/2012 | Seo et al. |
| 2013/0337761 A1* | 12/2013 | Kyperountas ........ H04B 1/1027 455/307 |

* cited by examiner (a)

(b)

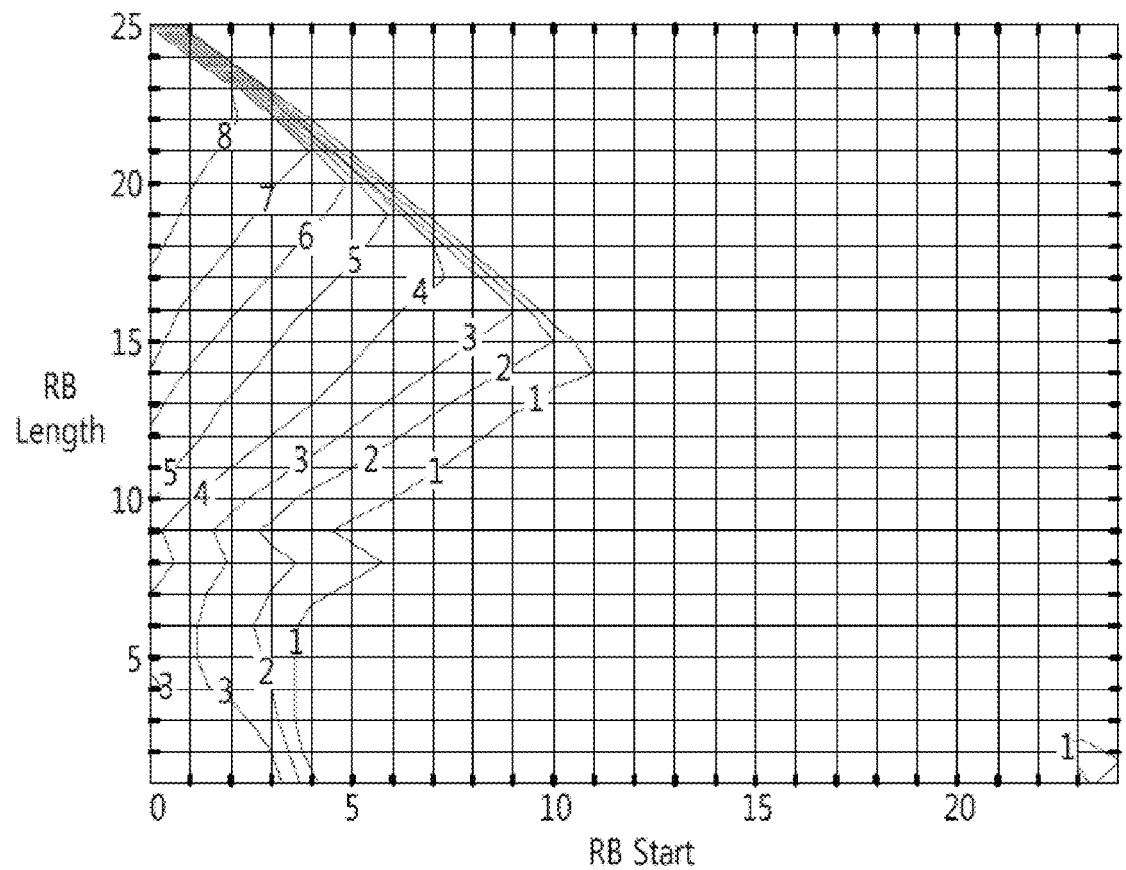

METHOD AND TERMINAL FOR PERFORMING UP-LINK TRANSMISSION AT REDUCED POWER

CROSS REFERENCE TO RELATED APPLICATIONS

This application is the National Phase of PCT/KR2013/006978 filed on Aug. 2, 2013, which claims priority under 35 U.S.C. 119(e) to U.S. Provisional Application No. 61/682,325 filed on Aug. 13, 2012, and 61/857,225 filed on Jul. 22, 2013, all of which are hereby expressly incorporated by reference into the present application.

FIELD OF THE INVENTION

The present invention relates to a method and a terminal for performing uplink transmission at reduced power.

RELATED ART

3GPP (3rd Generation Partnership Project) LTE (Long Term Evolution) that is an advancement of UMTS (Universal Mobile Telecommunication System) is being introduced with 3GPP release 8

In 3GPP LTE, OFDMA (orthogonal frequency division multiple access) is used for downlink, and SC-FDMA (single carrier-frequency division multiple access) is used for uplink. To understand OFDMA, OFDM should be known. OFDM may attenuate inter-symbol interference with low complexity and is in use. OFDM converts data serially input into N parallel data pieces and carries the data pieces over N orthogonal sub-carriers. The sub-carriers maintain orthogonality in view of frequency. Meanwhile, OFDMA refers to a multiple access scheme that realizes multiple access by independently providing each user with some of sub-carriers available in the system that adopts OFDM as its modulation scheme.

FIG. 1 shows a wireless communication system.

As shown in FIG. 1. the wireless communication system includes at least one base station (BS) 20 Each BS 20 provide a communication service to particular geographical areas 20a, 20b, and 20c (which are generally called cells).

In this case, communication from the base station to the user equipment is denoted downlink (DL), and communication from the user equipment to the base station is denoted uplink (UL).

In case base stations are presented by a number of service providers in the geographical areas 20a, 20b, and 20c, interference may occur therebetween.

For excluding such interference, each service provider may offer a service with a different frequency band.

However, in case the frequency bands from the service providers are positioned adjacent to each other, the problem of interference still remains. Such interference issue may be addressed by reducing transmission power. However, the reduced transmission power may result in a reduction in service coverage. Accordingly, a need exists for a method for reducing transmission power to a proper level without causing the interference issue.

SUMMARY OF THE INVENTION

Accordingly, one disclosure of the present invention has been made in an effort to provide a method that can perform transmission while reducing transmission power to an appropriate level.

In order to achieve the above object, in one aspect, there is provided a method for performing uplink transmission at reduced power. The method may comprise: receiving system information from a base station, the system information including at least one of first information on an operating band and second information on an uplink bandwidth; receiving a network signal regarding additional power reduction from the base station; determining a power reduction amount additionally required to reduce interference to a band of a public safety network adjacently positioned according to the network signal when an operating band indicted in the first information is within a range of 777 MHz to 787 MHz and a bandwidth indicated by the second information is 5 MHz in a range of 777 MHz to 782 MHz; and performing uplink transmission at the reduced power.

The determined power reduction amount varies depending on whether the band of the public safety network being separated from 1 MHz or 2 MHz.

If the band of the public safety network is separated from the operating band by 1 MHz, the band of the public safety network is within the range of 768 to 776 MHz. If the band of the public safety network is separated from the operating band by 2 MHz, the band of the public safety network is within a range of 769 to 775 MHz.

The determined power reduction amount may vary depending on a start position of an uplink resource block indicated by information on the uplink resource and the number of continued resource blocks.

In order to achieve the above object, in one aspect, there is provided a terminal for performing uplink transmission at reduced power. The terminal may comprise: an RF unit receiving system information from a base station, the system information including at least one of first information on an operating band and second information on an uplink bandwidth; and a processor determining a power reduction amount additionally required to reduce interference to a band of a public safety network adjacently positioned according to the network signal when an operating band indicted in the first information is within a range of 777 MHz to 787 MHz and a bandwidth indicated by the second information is 5 MHz in a range of 777 MHz to 782 MHz and controlling the RF unit to perform the uplink transmission at the reduced power.

According to the disclosure of the present invention, uplink transmission is performed at reduced power to effectively reduce an influence by interference on an adjacent band.

BRIEF DESCRIPTION OF THE DRAWINGS

FIGS. 17a, 17b, 18a and 18b illustrate experimental results for limiting transmission power.

DESCRIPTION OF EXEMPLARY EMBODIMENTS

Figure 1:
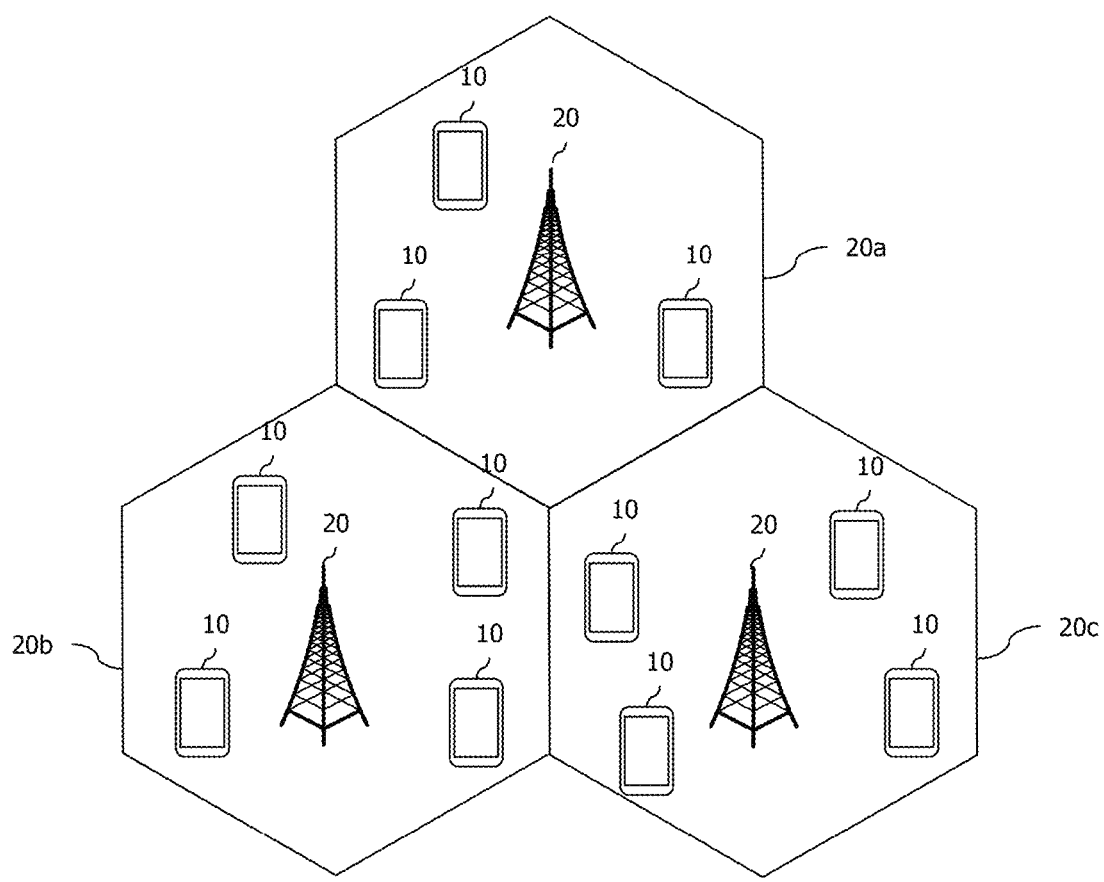
FIG. 1 illustrates a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

Figure 2:
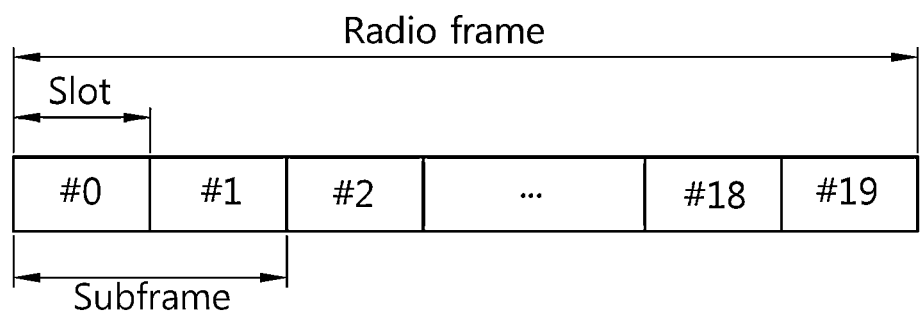
FIG. 2 illustrates a structure of a radio frame according to FDD in 3GPP LTE.

FIG. 2 illustrates the architecture of a radio frame according to FDD in 3GPP LTE.

For the radio frame shown in FIG. 2, 3GPP (3rd Generation Partnership Project) TS 36.211 V8.2.0 (2008-03) "Technical Specification Group Radio Access Network; Evolved Universal Terrestrial Radio Access (E-UTRA); Physical channels and modulation (Release 8)", Ch. 5 may be referenced.

Referring to FIG. 2, the radio frame consists of 10 sub-frames, and each sub-frame includes two slots. The slots in the radio frame are numbered with slot numbers 0 to 19. The time taken for one sub-frame to be transmitted is denoted TTI (transmission time interval). The TTI may be a scheduling unit for data transmission. For example, the length of one radio frame is 10 ms, the length of one sub-frame is 1 ms, and the length of one slot may be 0.5 ms.

The architecture of radio frame is merely an example, and the number of sub-frames in the radio frame or the number of slots in each sub-frame may be changed variously.

Meanwhile, one slot may include a plurality of OFDM symbols. How many OFDM symbols are included in one slot may vary depending on cyclic prefix (CP).

Figure 3:
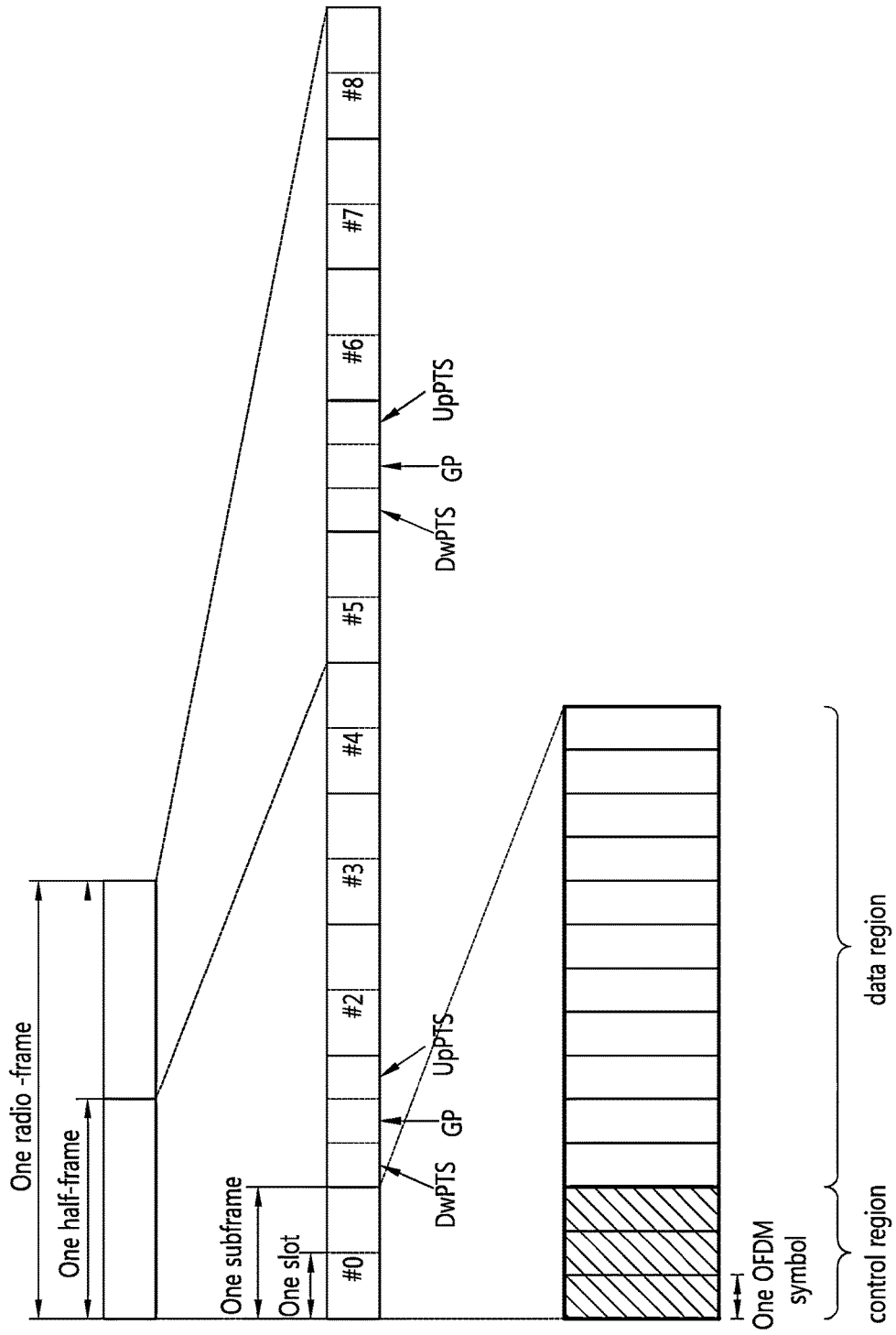
FIG. 3 illustrates a structure of a downlink radio frame according to TDD in 3GPP LTE.

FIG. 3 illustrates the architecture of a downlink radio frame according to TDD in 3GPP LTE.

For this, 3GPP TS 36.211 V8.7.0 (2009-05) "Evolved Universal Terrestrial Radio Access (E-UTRA); Physical Channels and Modulation (Release 8)", Ch. 4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access)

for downlink (DL), and thus, the multiple access scheme or name is not limited thereto. For example, OFDM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). According to 3GPP TS 36.211 V8.7.0, one slot, in the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Configuraiton | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

Figure 4:
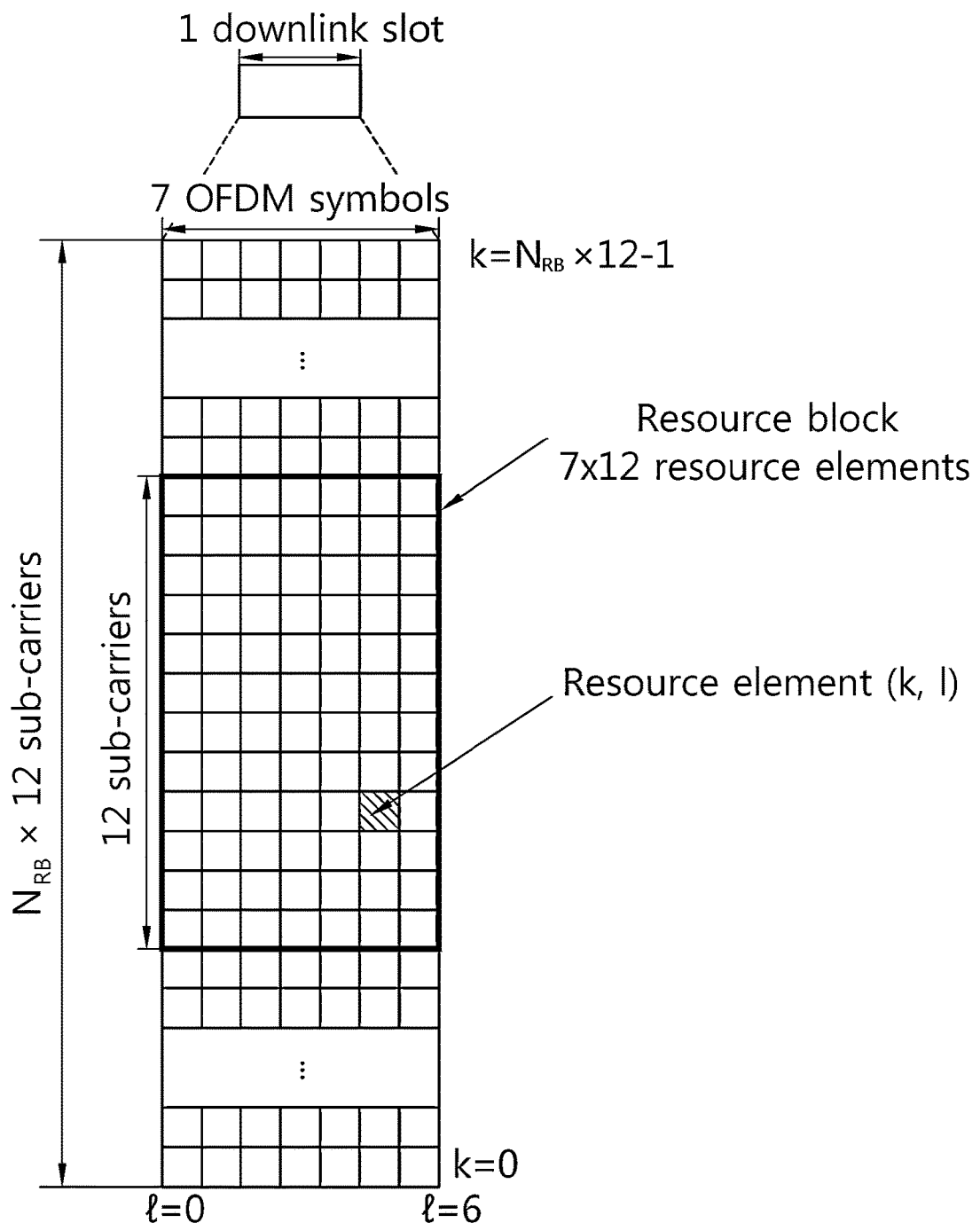
FIG. 4 is an exemplary diagram illustrating a resource grid for one uplink or downlink slot in the 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
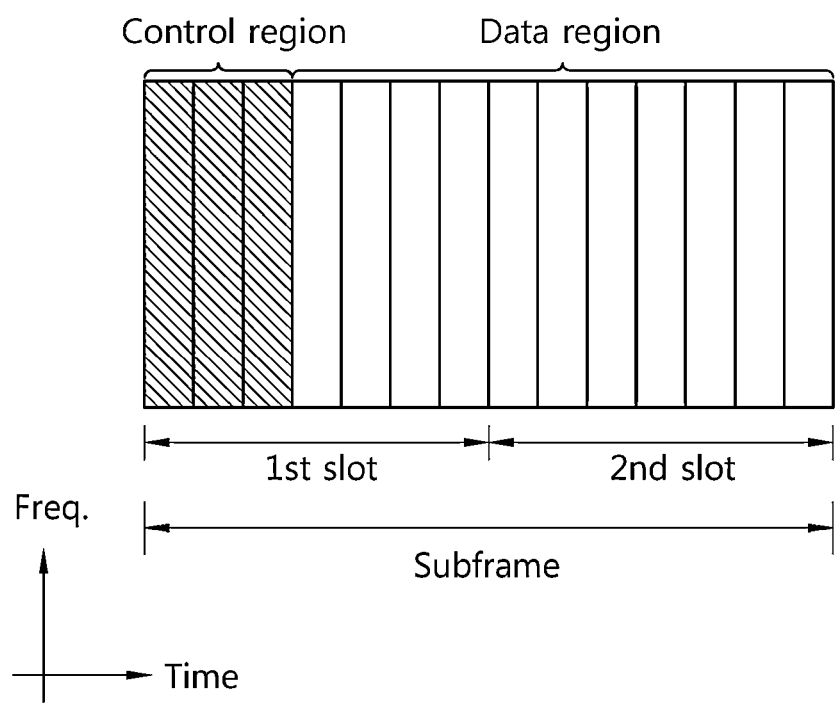
FIG. 5 illustrates a structure of a downlink subframe.

FIG. 5 illustrates the architecture of a downlink sub-frame.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Figure 6:
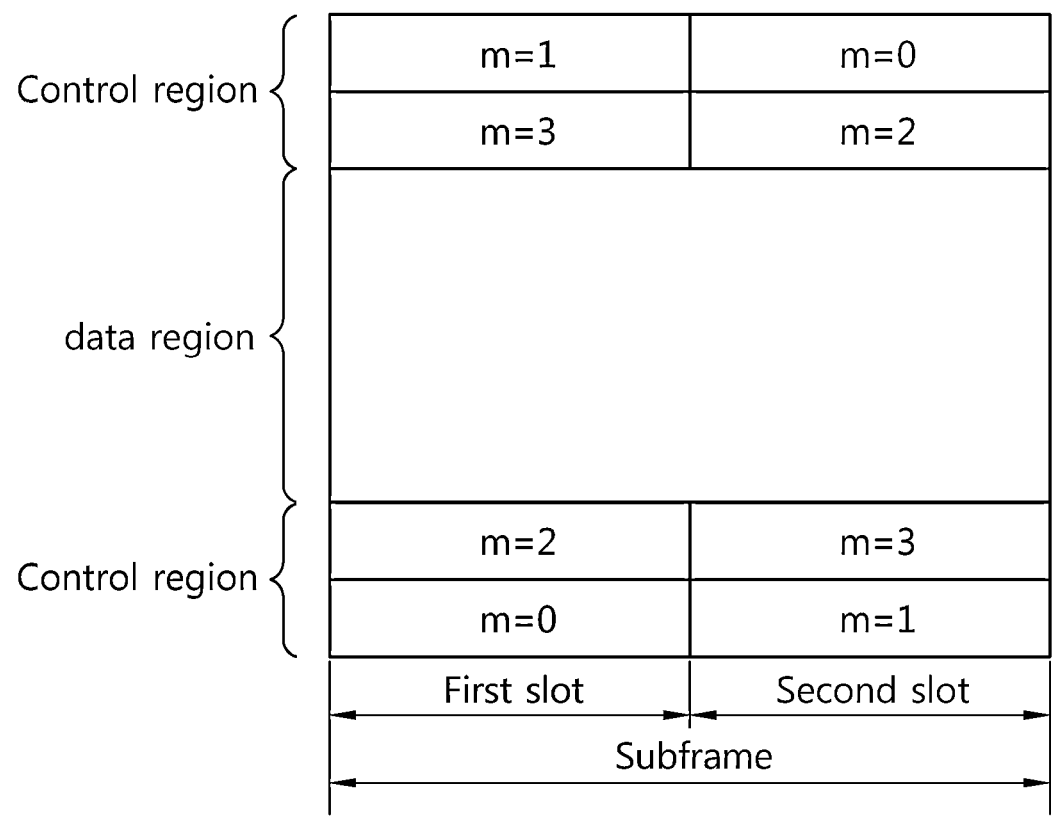
FIG. 6 illustrates a structure of an uplink subframe in the 3GPP LTE.

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

A carrier aggregation system is now described.

Figure 7:
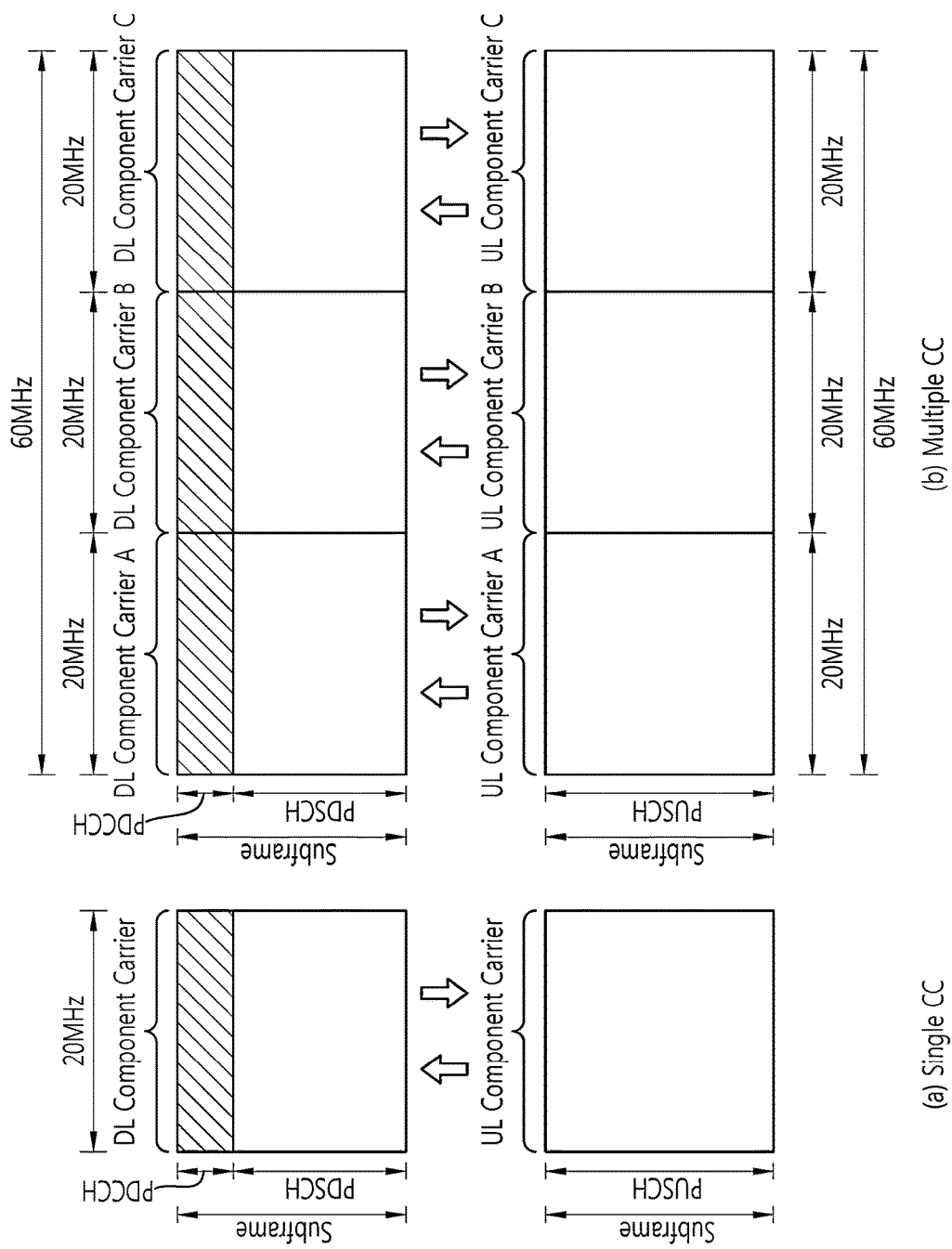
FIG. 7 illustrates a comparative example of a single carrier system in the related art and a carrier aggregation system.

FIG. 7 illustrates an example of comparison between a single carrier system and a carrier aggregation system.

Referring to FIG. 7, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of a uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

The PCC (primary component carrier) means a component carrier (CC) corresponding to the primary cell. The PCC is, among several CCs, the one where the terminal initially achieves connection or RRC connection with the base station. The PCC is a special CC that is in charge of connection or RRC connection for signaling regarding multiple CCs and manages terminal context information (UE context) that is connection information related with the terminal. Further, the PCC achieves connection with the terminal, so that the PCC is always left in the activation state when in RRC connected mode. The downlink component carrier corresponding to the primary cell is denoted downlink primary component carrier (DL PCC) and the uplink component carrier corresponding to the primary cell is denoted uplink primary component carrier (UL PCC).

The SCC (secondary component carrier) means a CC corresponding to a secondary cell. That is, the SCC is a CC other than the PCC, which is assigned to the terminal and is an extended carrier for the terminal to perform additional resource allocation in addition to the PCC. The SCC may be left in activation state or deactivation state. The downlink component carrier corresponding to the secondary cell is denoted downlink secondary component carrier (DL SCC) and the uplink component carrier corresponding to the secondary cell is denoted uplink secondary component carrier (UL SCC).

The primary cell and the secondary cell have the following characteristics.

First, the primary cell is used for transmitting a PUCCH. Second, the primary cell is always left activated while the secondary cell may be activated/deactivated depending on a specific condition. Third, when the primary cell experiences a radio link failure (hereinafter, 'RLF'), RRC re-connection is triggered. Fourth, the primary cell may be varied by a handover procedure that comes with an RACH (random access channel) procedure or by altering a security key. Fifth, NAS (non-access stratum) information is received through the primary cell. Sixth, in the FDD system, the primary cell has always a pair of a DL PCC and a UL PCC. Seventh, a different component carrier (CC) may be set as a primary cell in each terminal. Eighth, the primary cell may be replaced only through a handover or cell selection/cell re-selection procedure. In adding a new serving cell, RRC signaling may be used to transmit system information of a dedicated serving cell.

When configuring a serving cell, a downlink component carrier may form one serving cell or a downlink component carrier and an uplink component carrier form a connection to thereby configure one serving cell. However, a serving cell is not configured with one uplink component carrier alone.

Activation/deactivation of a component carrier is equivalent in concept to activation/deactivation of a serving cell. For example, assuming that serving cell 1 is constituted of DL CC1, activation of serving cell 1 means activation of DL CC1. If serving cell 2 is configured by connection of DL CC2 and UL CC2, activation of serving cell 2 means activation of DL CC2 and UL CC2. In this sense, each component carrier may correspond to a serving cell.

The number of component carriers aggregated between uplink and downlink may vary. When the number of downlink CCs is the same as the number of uplink CCs is denoted symmetric aggregation, and when the numbers differ from each other is denoted asymmetric aggregation. Further, the sizes (i.e., bandwidth) of CCs may be different from each other. For example, when five CCs are used to configure a 70 MHz band, the configuration may be made as follows: 5 MHz CC(carrier #0)+20 MHz CC(carrier #1)+20 MHz CC(carrier #2)+20 MHz CC(carrier #3)+5 MHz CC(carrier #4).

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 8:
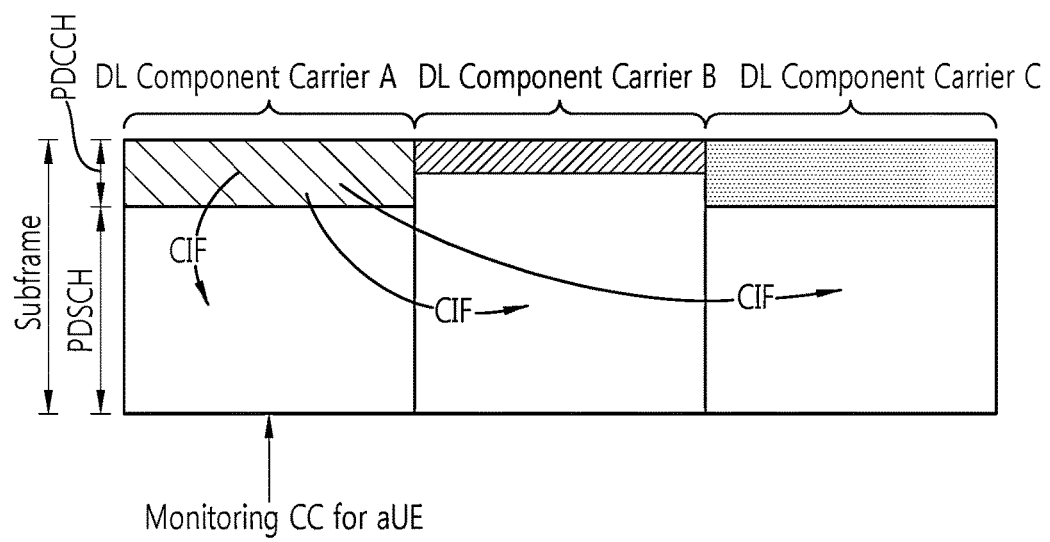
FIG. 8 exemplifies cross carrier scheduling in the carrier aggregation system.

FIG. 8 illustrates an example of cross-carrier scheduling in a carrier aggregation system.

Referring to FIG. 8, the base station may configure a PDCCH monitoring DL CC (monitoring CC) set. The PDCCH monitoring DL CC set consists of some of all the aggregated DL CCs. If cross-carrier scheduling is configured, the terminal conducts PDCCH monitoring/decoding only on the DL CCs included in the PDCCH monitoring DL CC set. In other words, the base station transmits a PDCCH for PDSCH/PUSCH to be scheduled only through the DL CCs included in the PDCCH monitoring DL CC set. The PDCCH monitoring DL CC set may be configured terminal-specifically, terminal group-specifically, or cell-specifically.

In FIG. 8, three DL CCs (DL CC A, DL CC B, and DL CC C) are aggregated, and by way of example, DL CC A is set as the PDCCH monitoring DL CC set. The terminal may receive a DL grant for the PDSCH of DL CC A, DL CC B, and DL CC C through the PDCCH of DL CC A. The DCI transmitted through the PDCCH of DL CC A includes a CIF which allows it to be known which DL CC the DCI is for.

The CIF value is the same as the serving cell index value. The serving cell index is transmitted to the UE through an RRC signal. The serving cell index includes a value for identifying a serving cell, i.e., a first cell (primary cell) or a second cell (secondary cell). For example, 0 may represent a first cell (primary cell).

Meanwhile, the carrier aggregation (CA) technologies, as described above, may be generally separated into an inter-band CA technology and an intra-band CA technology. The inter-band CA is a method that aggregates and uses CCs that are present in different bands from each other, and the intra-band CA is a method that aggregates and uses CCs in the same frequency band. Further, CA technologies are more specifically split into intra-band contiguous CA, intra-band non-contiguous CA, and inter-band non-contiguous CA.

Figure 9:
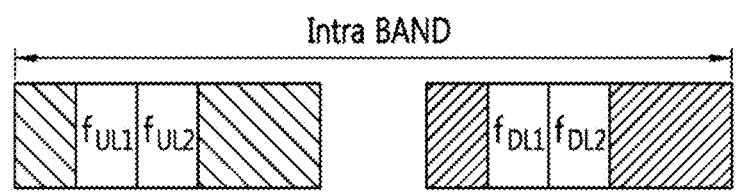
FIG. 9 is a conceptual diagram illustrating intra-band carrier aggregation (CA).
Figure 9:
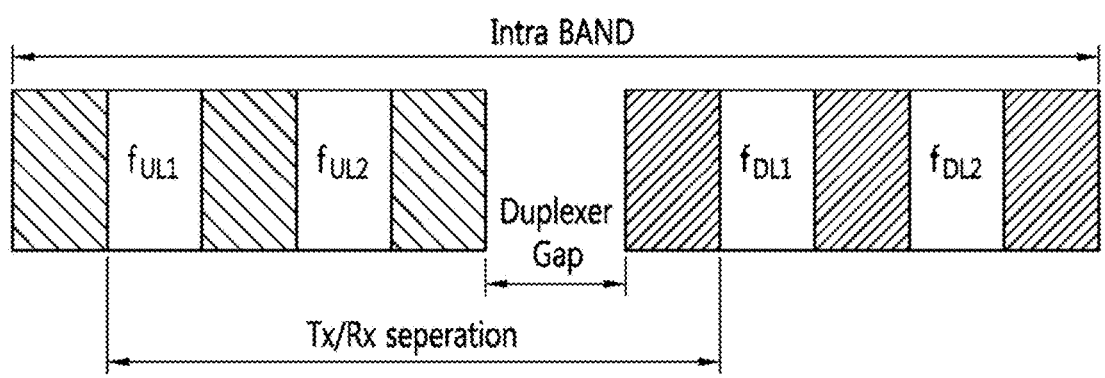

FIG. 9 is a concept view illustrating intra-band carrier aggregation (CA).

FIG. 9a illustrates intra-band contiguous CA, and FIG. 9b illustrates intra-band non-contiguous CA.

LTE-advanced adds various schemes including uplink MIMO and carrier aggregation in order to realize high-speed wireless transmission. The CA that is being discussed in LTE-advanced may be split into the intra-band contiguous CA shown in FIG. 9a and the intra-band non-contiguous CA shown in FIG. 9b.

Figure 10:
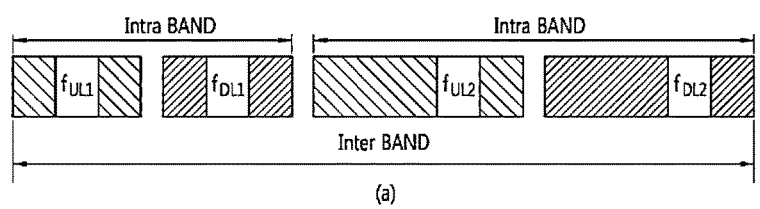
FIG. 10 is a conceptual diagram illustrating inter-band carrier aggregation according to an exemplary embodiment of the present invention.
Figure 10:
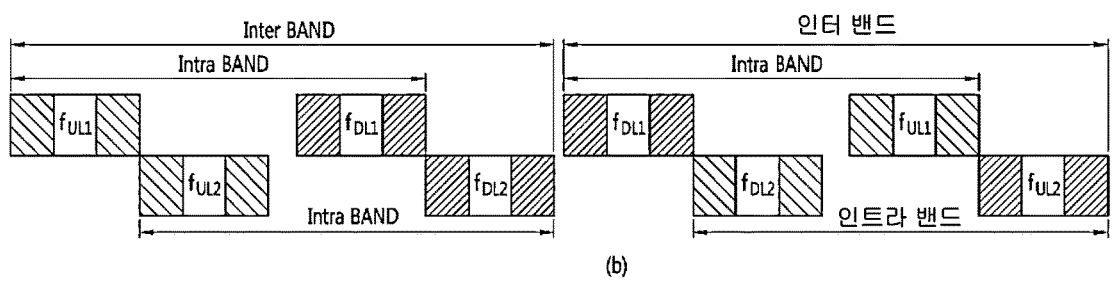

FIG. 10 is a concept view illustrating inter-band carrier aggregation.

FIG. 10a illustrates a combination of a lower band and a higher band for inter-band CA, and FIG. 10b illustrates a combination of similar frequency bands for inter-band CA.

In other words, the inter-band carrier aggregation may be separated into inter-band CA between carriers of a low band and a high band having different RF characteristics of inter-band CA as shown in FIG. 10a and inter-band CA of similar frequencies that may use a common RF terminal per component carrier due to similar RF (radio frequency) characteristics as shown in FIG. 10b.

TABLE 2

| Operating Band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 61 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A N/A | 717 MHz-728 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz 2690 MHz | 2496 MHz 2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

Meanwhile, the 3GPP LTE/LTE-A systems define operating bands for uplink and downlink as shown in Table 2 above. Four CA cases shown in FIG. 11 come from Table 2.

Here, $F_{UL\_low}$ means the lowest frequency in the uplink operating bands. $F_{UL\_high}$ means the highest frequency in the uplink operating bands. Further, $F_{DL\_low}$ means the lowest frequency in the downlink operating bands, and $F_{DL\_high}$ means the highest frequency in the downlink operating bands.

When the operating bands are defined as shown in Table 2, each nation's frequency distributing organization may assign specific frequencies to service providers in compliance with the nation's circumstances.

Meanwhile, CA bandwidth classes and their corresponding guard bands are as shown in the following table.

TABLE 3

| CA Bandwidth Class | Aggregated Transmission Bandwidth Configuration | Maximum number of CCs | Nominal Guard Band BWGB |
|---|---|---|---|
| A | $N_{RB,agg} \leq 100$ | 1 | $0.05 BW_{Channel(1)}$ |
| B | $N_{RB,agg} \leq 100$ | 2 | FFS |
| C | $100 < N_{RB,agg} \leq 200$ | 2 | $0.05 \max(BW_{Channel(1)}, BW_{Channel(2)})$ |
| D | $200 < N_{RB,agg} \leq [300]$ | FFS | FFS |
| E | $[300] < N_{RB,agg} \leq [400]$ | FFS | FFS |
| F | $[400] < N_{RB,agg} \leq [500]$ | FFS | FFS |

In the above table, the brackets [ ] represent that the value therebetween is not completely determined and may be varied. FFS stands for 'For Further Study.' $N_{RB\_agg}$ is the number of RBs aggregated in an aggregation channel band.

Table 4 below shows bandwidth sets respective corresponding to CA configurations.

TABLE 4

E-UTRA CA configuration/Bandwidth combination set

| E-UTRA CA configuration | 50 RB + 100 RB (10 MHz + 20 MHz) | 75 RB + 75 RB (15 MHz + 15 MHz) | 75 RB + 100 RB (15 MHz + 20 MHz) | 100 RB + 100 RB (20 MHz + 20 MHz) | Maximum aggregated bandwidth [MHz] | Bandwidth Combination Set |
|---|---|---|---|---|---|---|
| CA_1C  |     | Yes |     | Yes | 40 | 0 |
| CA_7C  |     | Yes |     | Yes | 40 | 0 |
| CA_38C |     | Yes |     | Yes | 40 | 0 |
| CA_40C | Yes | Yes |     | Yes | 40 | 0 |
| CA_41C | Yes | Yes | Yes | Yes | 40 | 0 |

In the above table, CA configuration represents an operating bandwidth and CA bandwidth class. For example, CA_1C means operating band 2 in Table 2 and CA band class C in Table 3. All of the CA operating classes may apply to bands that are not shown in the above table.

Figure 11:
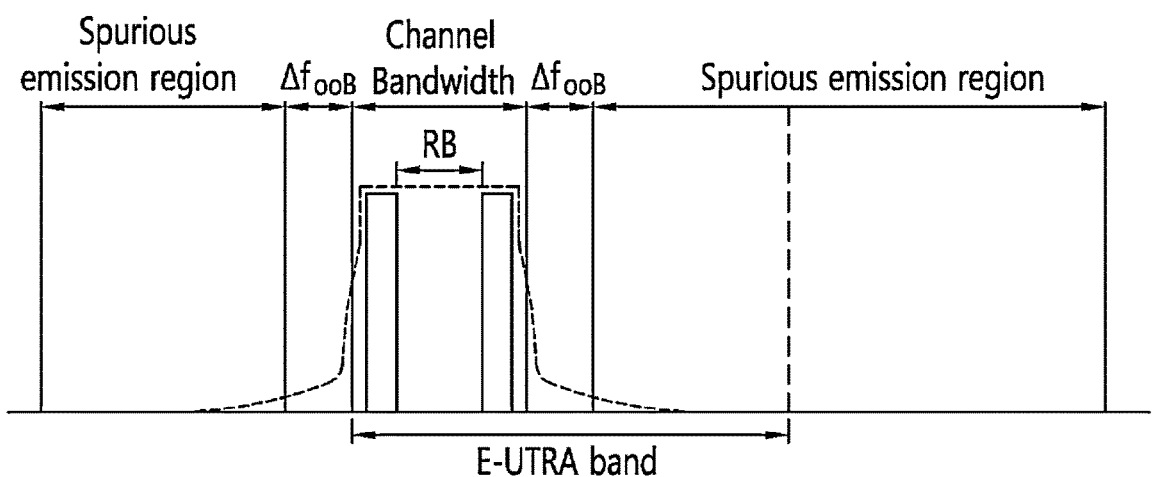
FIG. 11 illustrates a concept of unwanted emission.
Figure 12:
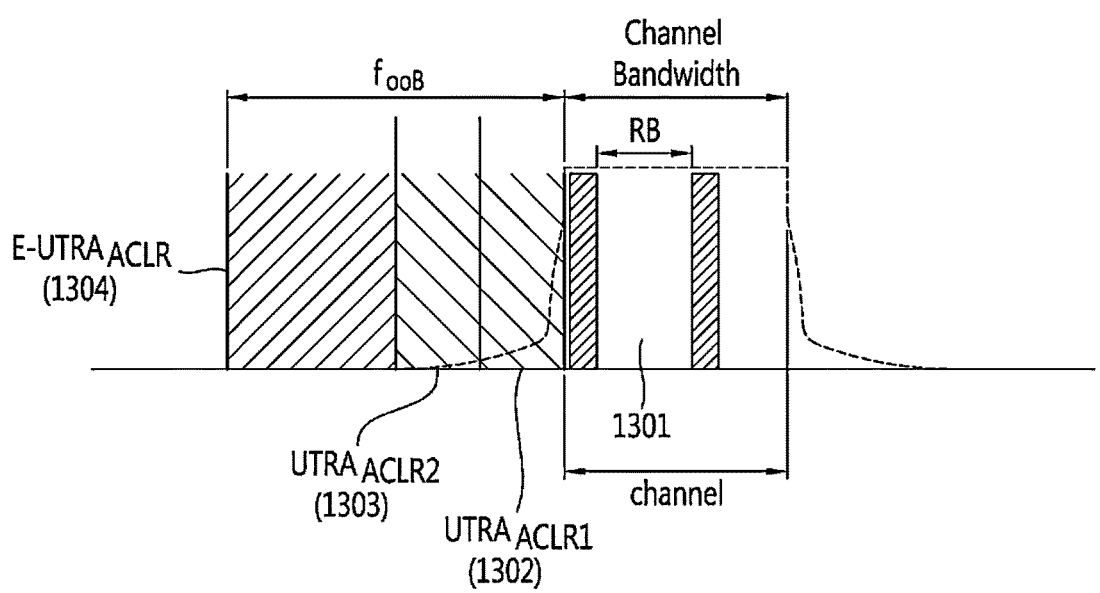
FIG. 12 illustrates, in detail, emission in an outside band in the unwanted emission illustrated in FIG. 11.
Figure 13:
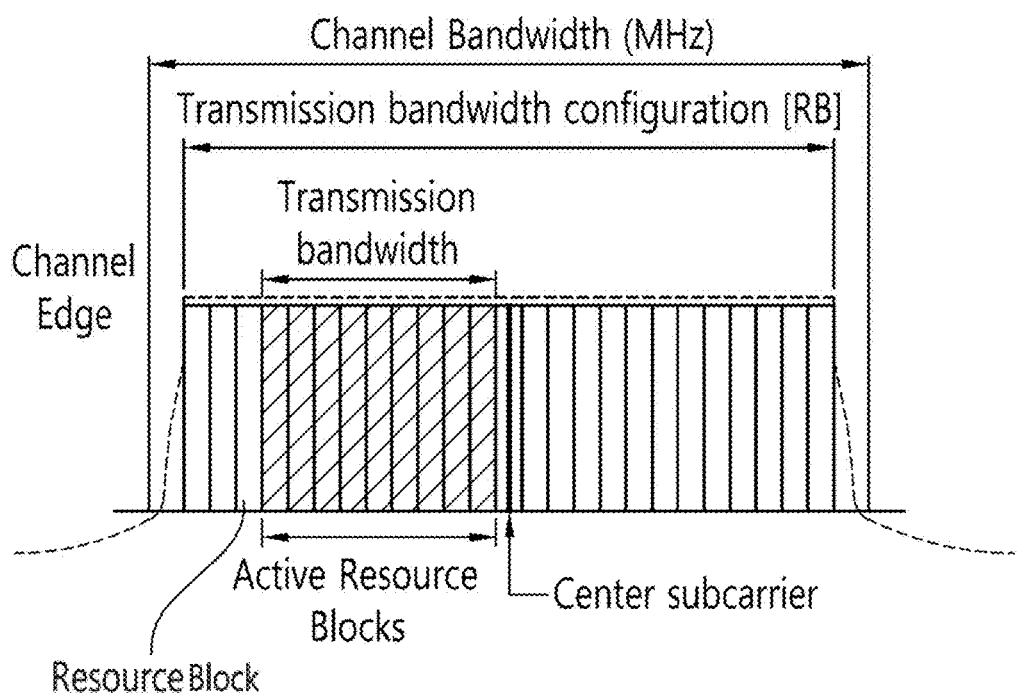
FIG. 13 illustrates the relationship between a channel band (MHz) and a resource block (RB) illustrated in FIG. 11.

FIG. 11 illustrates the concept of unwanted emission. FIG. 12 specifically illustrates out-of-band emission of the unwanted emission shown in FIG. 11. FIG. 13 illustrates a relationship between the resource block RB and channel band (MHz) shown in FIG. 11.

As can be seen from FIG. 11, a transmission modem sends a signal over a channel bandwidth assigned in an E-UTRA band.

Here, the channel bandwidth is defined as can be seen from FIG. 13. That is, a transmission bandwidth is set to be smaller than the channel bandwidth (BWChannel). The transmission bandwidth is set by a plurality of resource blocks (RBs). The outer edges of the channel are the highest and lowest frequencies that are separated by the channel bandwidth.

Meanwhile, as described above, the 3GPP LTE system supports channel bandwidths of 1.4 MHz, 3 MHz, 5 MHz, 10 MHz, 15 MHz, and 20 MHz. The relationship between such channel bandwidths and the number of resource blocks is as below.

TABLE 5

| | Channel bandwidth $BW_{Channel}$ [MHz] | | | | | |
|---|---|---|---|---|---|---|
| | 1.4 | 3 | 5 | 10 | 15 | 20 |
| Transmission bandwidth settings NRB | 6 | 15 | 25 | 50 | 75 | 100 |

Turning back to FIG. 11, unwanted emission arises in the band of ΔfOOB, and as shown, unwanted emission also occurs on the spurious area. Here, ΔfOOB means the magnitude in the out-of-band (OOB). Meanwhile, the out-of-band omission refers to the one that arises in a band close to an intended transmission band. The spurious emission means that unwanted waves spread up to a frequency band that is far away from the intended transmission band.

Meanwhile, 3GPP release 10 defines basic SE (spurious emission) that should not be exceeded according to a frequency range.

In the meantime, as illustrated in FIG. 12, if transmission is conducted in the E-UTRA channel band 1301, leakage, i.e., unwanted emission, occurs to out-of-bands (1302, 1303, and 1304 in the shown $f_{OOB}$ area).

Here, $UTRA_{ACLR1}$ denotes a ratio of leakage to a channel 1302 to an E-UTRA channel 1301, i.e., an adjacent channel leakage ratio, in case the adjacent channel 1302 is the one for UTRA when a terminal conducts transmission on the E-UTRA channel 1301. $UTRA_{ACLR2}$ is a ratio of leakage to a channel 1303 (a UTRA channel) located to the adjacent channel 1302, i.e., an adjacent channel leakage ratio, in case the channel 1303 is the one for UTRA, as shown in FIG. 13. $E\text{-}UTRA_{ACLR}$ is a ratio of leakage to an adjacent channel 1304 (i.e., an E-UTRA channel) when the terminal conducts transmission through the E-UTRA channel 1301, i.e., an adjacent channel leakage ratio.

As set forth above, if transmission is conducted in an assigned channel band, unwanted emission occurs to adjacent channels.

As described above, unwanted emission arises to bands adjacent to each other. At this time, with respect to interference caused by transmission from the base station, the amount of interference to adjacent bands may be reduced to an allowed reference or less by designing a high-price and bulky RF filter in view of the base station's nature. On the contrary, in the case of the terminal, it is difficult to completely prevent interference to adjacent bands due to, e.g., the limited size of terminal and limited price of the power amplifier or pre-duplex filter RF device.

Accordingly, the terminal's transmission power needs to be limited.

Figure 14:
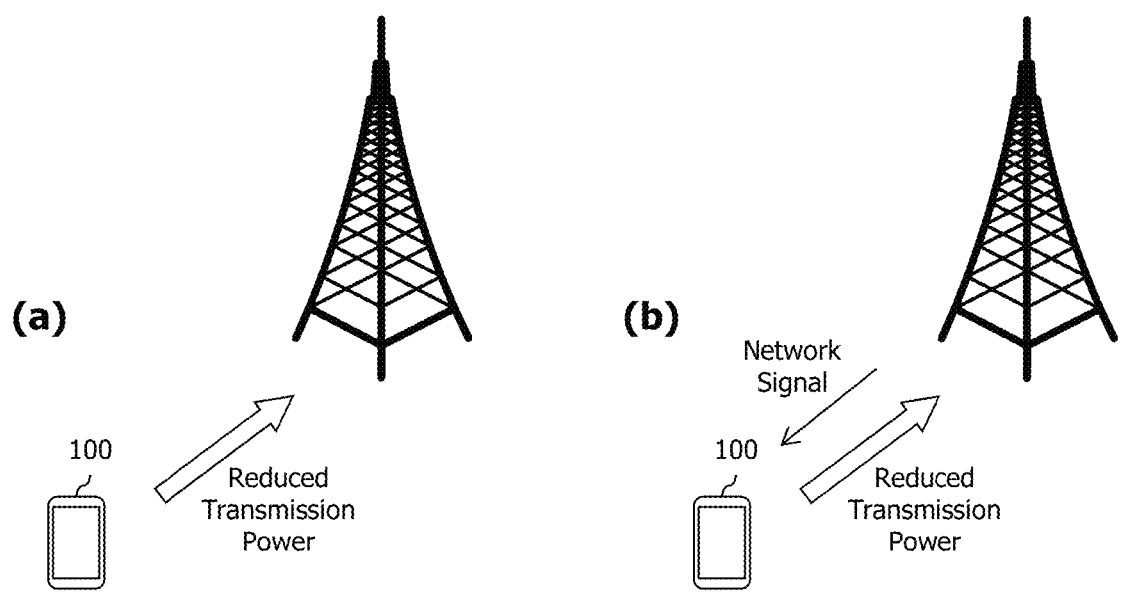
FIG. 14 is an exemplary diagram illustrating a method for limiting transmission power of a UE.

FIG. 14 illustrates an example of a method of limiting transmission power of a terminal.

As can be seen from FIG. 14a, the terminal 100 conducts transmission with transmission power limited In case a PAPR (peak-to-average power ratio) is increased, linearity of the power amplifier (PA) is reduced, as an MPR (maximum power reduction) value for limiting transmission power, an MPR value up to 2 dB may apply depending on modulation schemes in order to maintain such linearity. This is shown in the following table.

TABLE 6

| | Channel bandwidth/ Transmission bandwidth (NRB) | | | | | | |
|---|---|---|---|---|---|---|---|
| Modulation | 1.4 MHz | 3.0 MHz | 5 MHz | 10 MHz | 15 MHz | 20 MHz | MPR (db) |
| QPSK | >5 | >4 | >8 | >12 | >16 | >18 | ≤1 |
| 16 QAM | ≤5 | ≤4 | ≤8 | ≤12 | ≤16 | ≤18 | ≤1 |
| 16 QAM | >5 | >4 | >8 | >12 | >16 | >18 | ≤2 |

Table 6 above represents MPR values for power classes 1 and 3.

<MPR Per 3GPP Release 11>

Meanwhile, according to 3GPP release 11, the terminal adopts multi-cluster transmission in a single CC (component carrier) and may simultaneously transmit a PUSCH and a PUCCH. As such, if the PUSCH and the PUCCH are transmitted at the same time, the size of the IM3 component (which means a distortion signal generated by intermodulation) that occurs at an out-of-band area may be increased as compared with the existing size, and this may serve as larger interference to an adjacent band. Thus, the following MPR value may be set so as to meet general spurious emission, ACLR (adjacent channel leakage ratio) and general SEM (spectrum emission mask) that are the terminal's emission requirements that should be observed by the terminal upon uplink transmission.

$$\text{MPR}=\text{CEIL}\{M_A, 0.5\} \quad \text{[Equation 1]}$$

Here, $M_A$ is as follows.
$M_A=[8.0]-[10.12]A; 0<A\leq[0.33]$
$[5.67]-[3.07]A; [0.33]<A\leq[0.77]$
$[3.31]; [0.77]<A\leq[1.0]$
Here, A is as follows.
$A=N_{RB\_alloc}/N_{RB}$.
$N_{RB\_agg}$ is the number of RBs in the channel band, and $N_{RB\_alloc}$ is the total number of RBs that are transmitted at the same time.

CEIL$\{M_A, 0.5\}$ is a function that rounds off on a per-0.5 dB basis. That is, MPR∈[3.0, 3.5 4.0 4.5 5.0 5.5 6.0 6.5 7.0 7.5 8.0].

The MPR value shown in Equation 2 above is the one that applies when a general PA (power amplifier) is used. If a high efficiency power amplifier (HEPA) that is recently being researched is used, an MPR value of a higher level may be needed. However, despite its advantage that it may reduce power consumption and heat radiation by 30% or more, the HEPA suffers from reduced cell coverage that comes from demand of a larger MPR value. Further, since linearity is guaranteed only up to 20 MHz to date, linearity is not insured considering carrier aggregation (CA).

<MPR Depending on CA>

On the other hand, when the CA is considered, an uplink channel bandwidth may increase up to a maximum of 40 MHz (20 MHz+20 MHz), and as a result, a larger MPR value is required.

TABLE 7

| | CA bandwidth class C | | | | |
|---|---|---|---|---|---|
| Modulation | 50 RB + 100 RB | 75 RB + 75 RB | 75 RB + 100 RB | 100 RB + 100 RB | MPR (dB) |
| QPSK | >12 and ≤50 | >16 and ≤75 | >16 and ≤75 | >18 and ≤100 | ≤1 |
| QPSK | >50 | >75 | >75 | >100 | ≤2 |
| 16 QAM | ≤12 | ≤16 | ≤16 | ≤18 | ≤1 |
| 16 QAM | >12 and ≤50 | >16 and ≤75 | >16 and ≤75 | >18 and ≤100 | ≤2 |
| 16 QAM | >50 | >75 | >75 | >100 | ≤3 |

Table 7 given above shows an MPR value for power class 3.

As shown in Table 7 given above, in the case of class C of intra continuous CA, an MPR value of a maximum of 3 dB may be applied according to a modulation scheme. Meanwhile, when multi-cluster transmission under a CA class C environment is considered, an MPR value in an equation given below needs to be satisfied.

$$\text{MPR}=\text{CEIL}\{M_A, 0.5\} \quad \text{[Equation 2]}$$

Here, $M_A$ will be described below.
MA=8.2; 0≤A<0.025
9.2-40A; 0.025≤A<0.05
8-16A; 0.05≤A<0.25
4.83-3.33A; 0.25≤A≤0.4,
3.83-0.83A; 0.4≤A≤1, <MPR Depending on CA>

As known with reference to FIG. 14b, the base station transmits a network signal NS to the UE 100 to adopt additional maximum power reduction (A-MPR). In the case of the A-MPR, the base station transmits the network signal NS to the UE 100 that operates in a specific operating band to allow the UE 100 to additionally perform power reduction, in order to prevent an influence such as interference on an adjacent band, and the like unlike the MPR mentioned above. That is, when the UE adopting the MPR receives the network signal NS, the A-MPR is additionally adopted to determine transmission power.

Figure 15A:
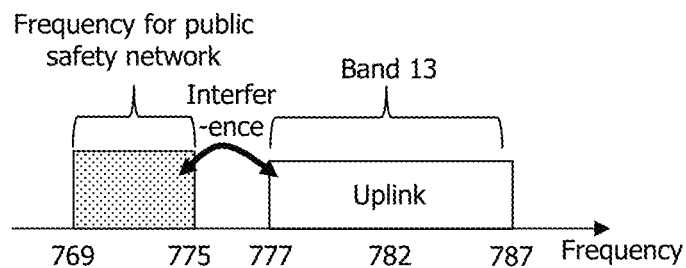
FIGS. 15a through 15c illustrate an example in which interference occurs when a predetermined provider uses an adjacent band to a band of another provider.
Figure 15B:
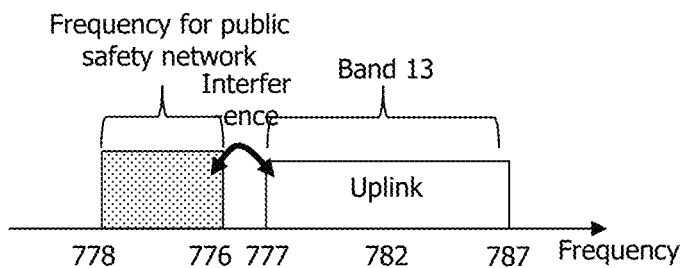
Figure 15C:
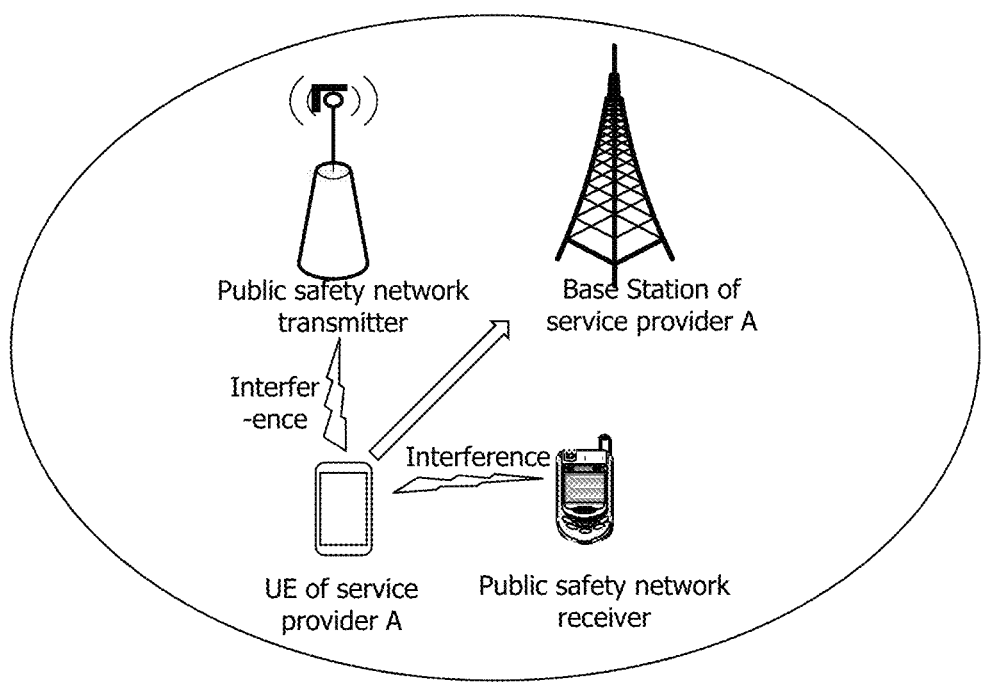

FIGS. 15a through 15c Illustrate an Example in which Interference Occurs when a Predetermined Provider Uses an Adjacent Band to a Band of Another Provider.

As known with reference to FIG. 15a, a provider A is providing a service by being assigned with 777 MHz to 787 MHz through uplink of operating band 13 and 746 MHz to 756 MHz through downlink of the operating band 13 shown in Table 2.

In this case, as illustrated in FIG. 15a, a public safety network may be operated in a North America region in an adjacent 769 to 775 MHz band. In this case, the public safety network and the band 13 are spaced apart from each other only by approximately 2 MHz. Alternatively, as illustrated in FIG. 15b, the public safety network may be operated in the North America region in an adjacent 768 to 776 MHz band. In this case, the public safety network and the band 13 are spaced apart from each other only by approximately 1 MHz.

As illustrated in FIG. 15c under such a situation, when a UE of the provider A transmits the signal through the uplink band, that is, the 777 MHz-787 MHz band, spurious emission occurs, thereby giving frequency band interference of the public safety network. As described above, unwanted emission to adjacent bands occurs.

Therefore, a method is required, which limits UE transmission power in order to prevent an interference amount by UE wanted emission from exceeding an allowance value. However, when the transmission power is just reduced, service coverage is also reduced, and as a result, a method is required, which reduces the transmission power to an appropriate level within a range not to cause an interference problem.

Meanwhile, as illustrated in FIG. 15a, in the case where a frequency band of the public safety network is spaced apart from the band 13 only by approximately 2 MHz, when it is determined that the public safety network exists around a base station installation region in US, the base station transmits a signal (for example, defined as NS-07 at present in 3GPP) to the UE through network signaling to allow the UE to perform additional power reduction of the transmission power. Organizing the A-MPR defined as the NS-07 in the 3GPP at present will be shown in Table 8 given below.

TABLE 8

| Parameter | Region A | | Region B | | Region C |
|---|---|---|---|---|---|
| $RB_{start}$ | 0-12 | 0-12 | 13-18 | 19-42 | 43-49 |
| $L_{CRB}$ [RBs] | 6-8 | 1 to 5 and 9-50 | ≥8 | ≥18 | ≤2 |
| A-MPR [dB] | ≤8 | ≤12 | ≤12 | ≤6 | ≤3 |

However, an effort in US is to consider only the case where a channel bandwidth (CBW) is a band of 10 MHz.

On the contrary, there has been no research into the case where the channel bandwidth is 5 MHz in the meantime. The reason is that a channel bandwidth which Verizon which is a provider assigned with the band 13 will use is fixed to 10 MHz in US research into reduction of the UE transmission power is not performed even with respect to the case where a protection band with the Band 13 and the public safety network is 1 MHz. The reason is that frequency separation from the Band 13 and the public safety network is fixed to 2 MHz in the North America region.

In recent years, with a concern about the use of the channel bandwidth of 5 MHz which is a higher band of 700 MHz in Canada, the need of a coexistence research of the public safety network which was not researched in the related art and a public safety network by UE transmission leakage power in the case of using the channel band width of 5 MHz in a protection band of 1 MHz comes to the fore. When the uplink transmission is performed in the bandwidth of 5 MHz in the band 13 like the case of Canada, band-out emission where there are most cases in which the bandwidth is positioned at a left end of the band 13 close to the public safety network is introduced into the public safety network. However, additional UE transmission power reduction required in this case may be different from the case of US having the public safety network and a protection band of 2 MHz in 10 MHz bandwidth transmission in the related art. Further, in a border area of US and Canada, when a Canada-in UE performs the uplink transmissions in the channel bandwidth of 5 MHz, a research into coexistence by interference introduced the public safety network in US adjacent to Canada has never been made.

Accordingly, the present invention presents a method for reducing UE transmission power in order to protect the adjacent public safety network when the UE performs the transmission by using the channel band width of 5 MHz in the band 13, that is, the band of 700 MHz in Canada of a North American region or for predetermined UEs to coexist without interference by protecting the public safety network outside the border at the time of performing the transmission by using the channel bandwidth of 5 MHz in the band 13 in the border area of US and Canada.

Hereinafter, an additional power reduction method and a value thereof will be described, which should be set to protect a frequency band of an adjacent public safety network which is separated by 1 MHz when the UE performs the uplink transmission in the channel bandwidth of 5 MHz.

Figure 16A:
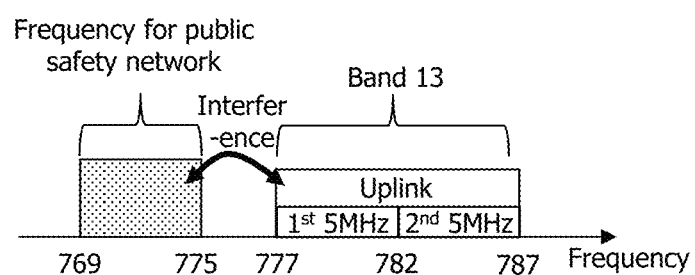
FIGS. 16a and 16b are an exemplary diagram illustrating a frequency band considered in the present invention.
Figure 16B:
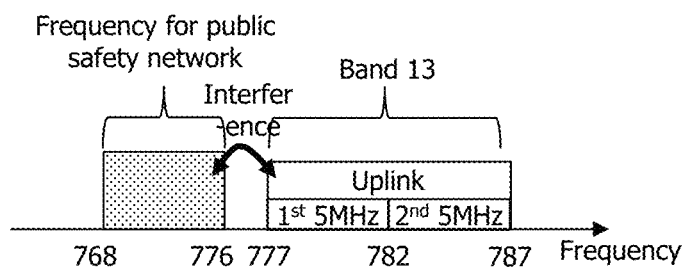

FIGS. 16a and 16b are an Exemplary Diagram Illustrating a Frequency Band Considered in the Present Invention.

The example illustrated in FIG. 16a is used to show an influence which the Canada UE exerts on the U.S. public safety network (769 to 775 MHz) in the border area of US and Canada and FIG. 16b is used to show an influence of interference which the U.S. UE exerts on the Canadian public safety network (768 to 776 MHz).

In general, the research into the coexistence with the adjacent band may be generally approached by two approach methods.

A first approach method is to view an influence of an aggressor system exerted on the existing system in terms of a system capacity. The approach method is used to show which degree a permissible interference amount is by performing a system simulation using the amount of interference introduced into the existing system as a variable. In general, the interference amount is determined based on a reference to permit reduction of a system capacity of 5% or less in the existing system.

A second approach method is to directly validate the case where the UE performs the transmission under a given frequency band and frequency deployment environment through an RF simulation. The RF simulation is a means for observing what form inter-modulation or harmonics caused by non-linear analog RF elements which the UE goes through at the time of performing the uplink transmission is emitted to the outside of the band by mathematically modeling the non-linear analog RF elements. In the case of the RF simulation used on the 3GPP, which degree of interference is introduced into the adjacent band is simulated by setting SEM-spectral emission mask, in-band emission such as carrier leakage (I/Q image), and adjacent channel leakage ratio (ACLR) (SE-spurious emission) as simulation parameters.

When the interference amount permitted to the adjacent band is determined and the interference amount exceeds the permission value on the simulation, it is verified to which degree the interference amount may be adjusted by reducing the UE transmission power by a predetermined amount or changing the size and the position of a UE transmission resource block (RB-resource block).

In the patent, among the aforementioned methods, the required transmission power reduction amount will be determined through the RF simulation which is a lot used in the standard generally.

In the simulation, leakage power permissible to the public safety network is set to −57 dBm/6.25 kHz like the case in the channel bandwidth of 10 MHz of the Band 13 in the related art.

Hereinafter, the RF simulation for reducing the band-out leakage power and the required UE transmissions power will be described. The simulation is performed as described below under the frequency deployment environment of FIG. 16. Further, the simulation is achieved in two cases of the case where the transmission 5 MHz band is positioned at a left edge (in the case where the transmission 5 MHz band is close to the public safety network) and the case where the transmission 5 MHz band is positioned at a right edge (in the case where the transmission 5 MHz band is distant from the public safety network) of the band 13. In addition, the simulation is achieved in two cases of the case where the protection band is 1 MHz (Canada) and the case where the protection band is 2 MHz (the border area of Canada and US)

Hereinafter, a transmission power controlling method according to one aspect of the present invention will be described according to an experimental result.

FIGS. 17a, 17b, 18a and 18b Illustrate Experimental Results for Limiting Transmission Power.

By considering the 1 MHz protection band and the 2 MHz protection band, the RF simulation is performed with respect to a first 5 MHz channel bandwidth (777 to 782 MHz) and a second 5 MHz channel bandwidth (777 to 782 MHz) and the resulting required A-MPR value is derived.

Operating points of RF components defined for the simulation in advance will be described below;
Modulator:
Image rejection=−28 dBc
Carrier leakage/LO leakage=−28 dBc
Counter IM3=−60 dBc
Power Amplifier:
$UTRA_{ACLR1}$=33 dBc
$UTRA_{ACLR2}$=36 dBc (for allocation of all RBs)
Spurious emission band UE co-existence: −57 dBm/6.25 kHz (for public safety network)
Duplex Attenuation is not Considered In this case, a unit, dBc represents a relative magnitude based on a power magnitude of a carrier frequency. Carrier leakage as carrier leakage is an additional sine waveform having a frequency which is the same as a modulation wave carrier frequency. Counter IM3 (counter intermodulation distortion) indicates an element caused by non-linear elements such as a mixer and the power amplifier in an RF system.

Figure 17B:
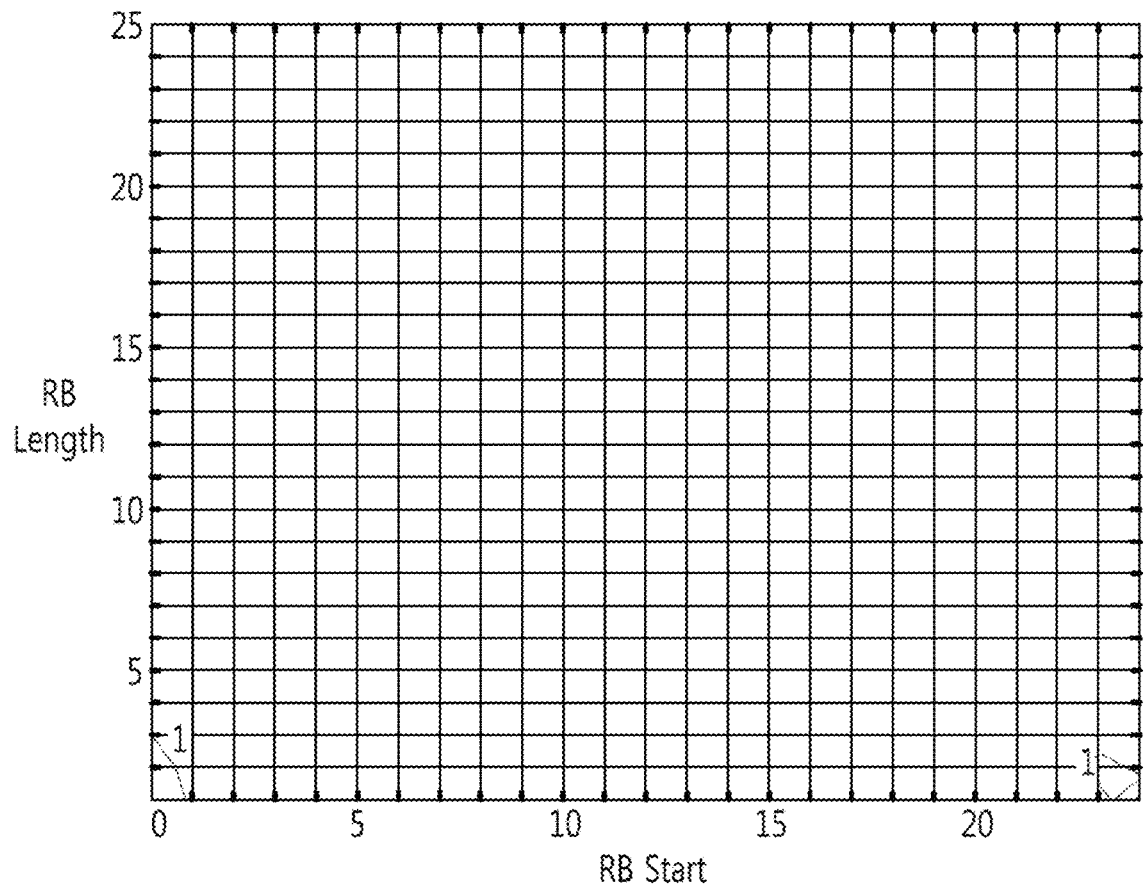

FIG. 17a illustrates an experimental result of the A-MPR for the first 5 MHz in the uplink band of the band 13 under an environment in which the public safety network is separated from the band 13 by 2 MHz. In addition, FIG. 17b illustrates an experimental result of the A-MPR for the second 5 MHz in the uplink band of the band 13 under the environment in which the public safety network is separated from the band 13 by 2 MHz.

Figure 18A:
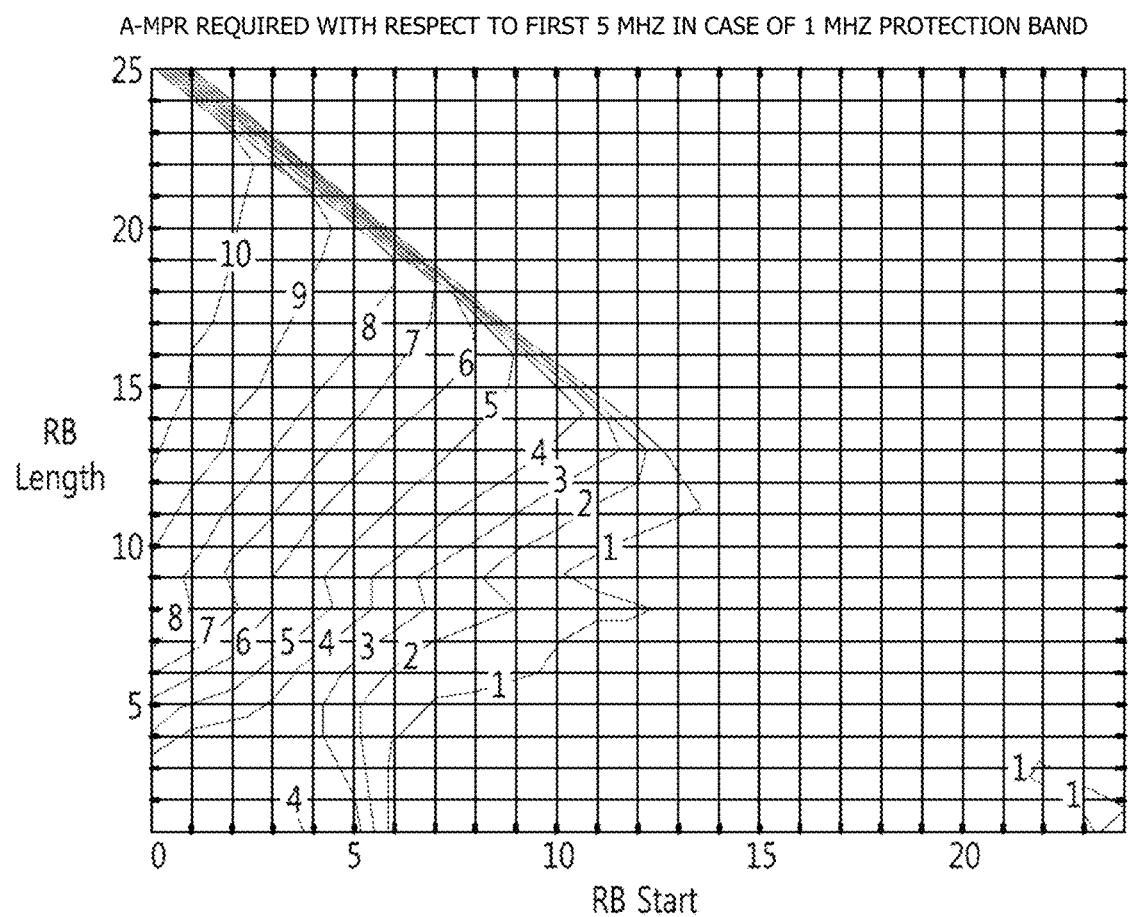
Figure 18B:
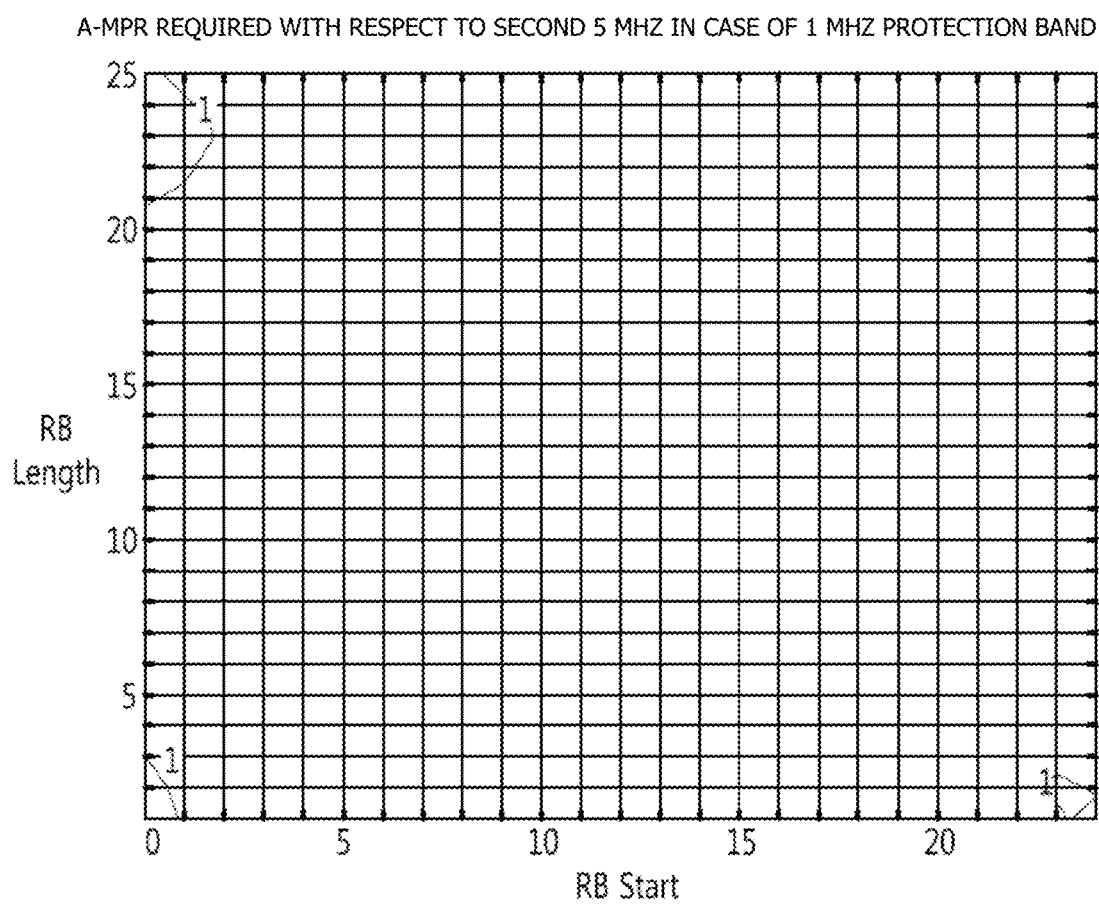

FIG. 18a illustrates an experimental result of the A-MPR for the first 5 MHz in the uplink band of the band 13 under an environment in which the public safety network is separated from the band 13 by 1 MHz. In addition, FIG. 18b illustrates an experimental result of the A-MPR for the second 5 MHz in the uplink band of the band 13 under the environment in which the public safety network is separated from the band 13 by 1 MHz.

From the experimental results of FIGS. 17 and 18, the A-MPR is not almost required with respect to the second 5 MHz, but it is verified that the value of the A-MPR of almost 9 to 11 dB is required depending on the protection band with respect to the first 5 MHz.

Further, the value of the A-MPR required with respect to the first 5 MHz in the case of the protection band of 1 MHz is larger than the value in the case of the protection band of 2 MHz by approximately 2 dB.

$RB_{start}$ represents a lowest RB index of the transmission resource block. Represents the length of continuously allocated resource blocks.

When the protection band is 2 MHz, the value of the A-MPR will be described below by using a table.

TABLE 9

| Channel bandwidth | Parameter | | Region A | Region B | Region C |
|---|---|---|---|---|---|
| 5 MHz | $RB_{start}$ | | 0-5 | 6-9  10-21 | 22-24 |
| | $L_{-CRB}$ [RBs] | 6-9 | 1-5 and 10-25 | ≥8  ≥10 | ≤2~3 |
| | A-MPR [dB] | ≤4~6 | ≤8~10 | ≤4~6  ≤2~4 | ≤1~3 |

When the protection band is 1 MHz, the value of the A-MPR will be described below by using the table.

TABLE 10

| Channel bandwidth | Parameter | Region A | | Region B | Region C |
|---|---|---|---|---|---|
| 5 MHz | $RB_{start}$ | 0-6 | | 7-9  10-20 | 21-24 |
| | $L_{-CRB}$ [RBs] | 6-9 | 1-5 and 10-25 | ≥5  ≥6 | ≤2~3 |
| | A-MPR [dB] | ≤8~10 | ≤10~12 | ≤6~8  ≤4~6 | ≤1~3 |

However, the value of RBstart, the value of LCRB, and the value of A-MPR given in Tables 9 and 10 given below may be changed within some ranges.

However, the value of RBstart, the value of LCRB, and the value of A-MPR given in Tables 9 and 10 given below may be changed within some ranges.

In summary, in the case where the public safety network is separated from the band 13 by only 1 MHz, when the UE performs the transmission on the first 5 MHz channel bandwidth of the band 13, the public safety network may be protected by reducing the transmission power to approximately 9 to 11 dB through the A-MPR. Consequently, when the UE receives the service at the geographical position where the public safety network exists, the base station instructs the UE to additionally reduce the transmission power through the network signaling. The corresponding UE receives the network signaling, the corresponding UE senses that the public safety network exists in the adjacent band to reduce the transmission power according to a transmission RB start position and an RB size through the transmission reduction table (Table 9 or 10 of the present invention) calculated in the UE in advance.

As described above, it can be seen that in the case of the UE transmission power, the A-MPR should be set to be higher than a maximum value by approximately 2 dB in the case of the 1 MHz protection band as compared with the 2 MHz protection band from the RF simulation result. That is, different A-MPR tables should be applied to the case where the protection band is 1 MHz and the case where the protection band 2 MHz, respectively. When Tables 9 and 10 are compared with each other, the A-MPR value to be applied in the case where the protection band 1 MHz is required to be larger than the V-MPR value in the case where the protection band is 2 MHz.

When additional network signaling is not applied, the A-MPR using NS-07 in the 10 MHz bandwidth shown in Table 8 may be applied, but it can be seen that this value requires excessive A-MPRA.

Accordingly, it can be seen that when the UE operates with the 1 MHz protection band in the 5 MHz band, additional network signaling is required in addition to the network signaling downloaded in the Band 13 in the related art, that is, NS-07. The additional network signalings in the case of the protection band of 1 MHz and the case of the protection band of 2 MHz should be distinguished from each other.

Consequently, in summary, like the example of FIG. 16a, when the UE having the 5 MHz channel bandwidth in Canada operates in a cell boundary region in Canada in addition to the Canada-US border area to influence the public safety network in US, the A-MPR value may be applied as if adding Tables 8 and 9 through the NS-07 network signaling.

However, like example of FIG. 16b, when the UE having the 5 MHz channel bandwidth in Canada operates on the cell boundary region in Canada, the A-MPR value of Table 10 is preferably applied through new network signaling such as NS-xx.

The embodiments of the present invention may be implemented through various means. For example, the embodiments of the present invention may be implemented by hardware, firmware, software, or combinations thereof. In detail, this will be described with reference to FIG. 21.

Up to now, in order to protect the public safety network, a result of experimenting the required A-MPR value through the simulation has been described.

Hereinafter, an operation will be described.

Figure 19A:
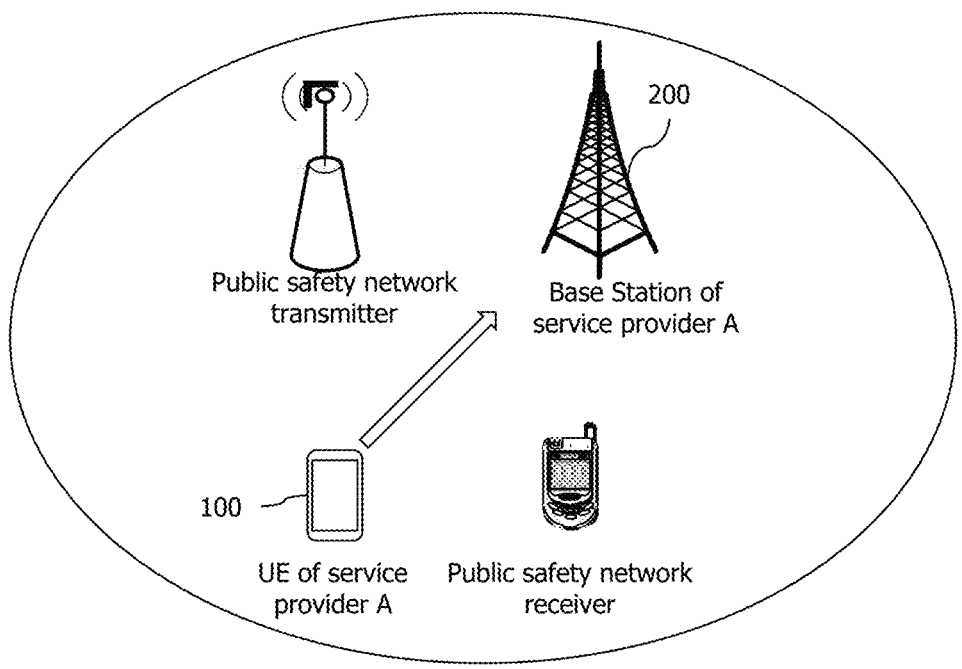
FIGS. 19a and 19b illustrate an operation in accordance with a scheme presented in the present invention.
Figure 19B:
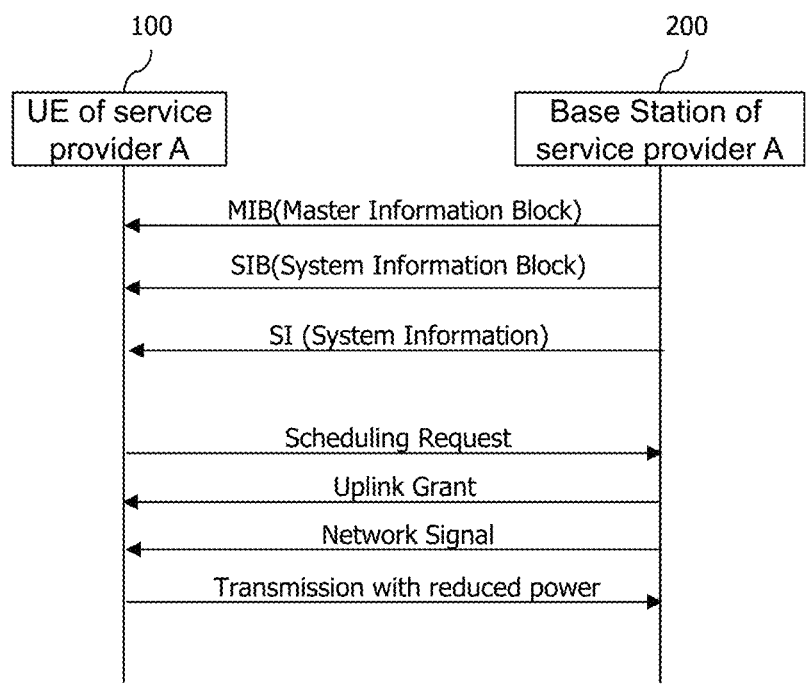

FIGS. 19a and 19b Illustrate an Operation in Accordance with a Scheme Presented in the Present Invention.

As known with reference to FIG. 19a, a provider A is providing a service by being assigned with 777 MHz to 787 MHz through uplink of the operating band 13 and 746 MHz to 756 MHz through downlink of the operating band 13 shown in Table 2.

In this case, in the North America region, the public safety network may be operated in the 769 to 775 MHz band adjacent, which is separated from the uplink by approximately 2 MHz. Alternatively, the public safety network may be operated in the 768 to 776 MHz band adjacent, which is separated from the uplink by approximately 1 MHz.

Under such a situation, the base station 200 of the provider A transmits a master information block (MIB) and a system information block (SIB) to the UE 100.

The system information block (SIB) may include at least one of information on the operating band of the base station 200 and information on the uplink (UL) bandwidth in the operating bands shown in Table 2. The information on the uplink (UL) bandwidth may include information on the number of resource blocks (RBs). In the example of FIG. 19, the UE 100 receives information on the operating band 13 shown in Table 2 through the system information block (SIB).

Meanwhile, the UE 100 transmits a scheduling request (SR) to the base station 200 when uplink data to be transmitted exist.

The base station 200 performs uplink resource allocation according to the scheduling request (SR) and transmits an uplink grant.

Additionally, the base station 200 transmits a network signal regarding power reduction to the UE 100.

Then, the UE 100 determines the value of the A-MPR according to Table 9 or 10 as described above. Subsequently, the UE 100 performs the uplink transmission at the reduced power.

For example, according to the information on the operating band, when the band of the public safety network is separated by 1 MHz, the value of the A-MPR may be determined according to Table 10. Alternatively, according to the information on the operating band, when the band of the public safety network is separated by 2 MHz, the value of the A-MPR may be determined according to Table 9. In this case, as illustrated in Table 9 or 10, the appropriate A-MPR value is determined according to the RB_Start (that is, the start position of the RB) and the L_CRB (the number of continued resource blocks).

The embodiments of the present invention may be implemented by various means. For example, the embodiments of the present invention may be implemented in hardware, firmware, software or a combination thereof.

Figure 20:
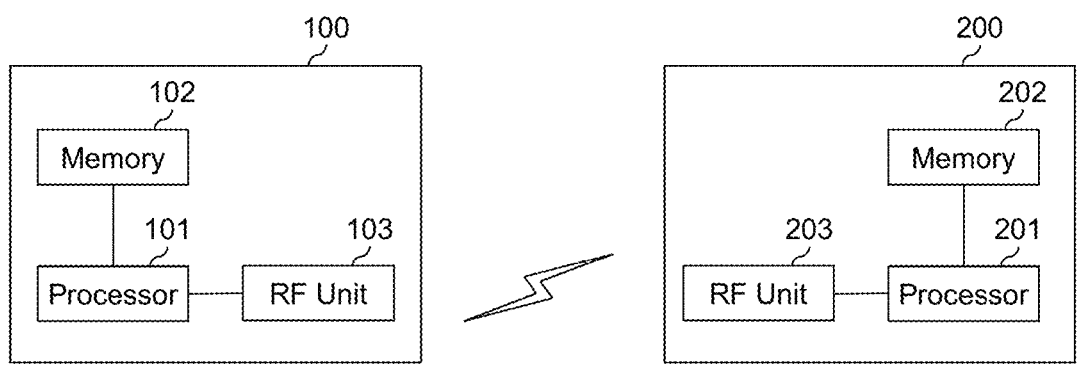
FIG. 20 is a block diagram illustrating a wireless communication system in which an exemplary embodiment of the present invention is implemented.

FIG. 20 is a block diagram illustrating a wireless communication system where an embodiment of the present invention is implemented.

The base station 200 includes a processor 201, a memory 202, and an RF (radio frequency) unit 203. The memory 202 is connected with the processor 201 and stores various pieces of information for driving the processor 201. The RF unit 203 is connected with the processor 201 and transmits and/or receives radio signals. The processor 201 implements functions, processes, and/or methods as suggested herein. In the above-described embodiments, the operation of the base station may be implemented by the processor 201.

The wireless device 100 includes a processor 101, a memory 102, and an RF unit 103. The memory 102 is connected with the processor 101 and stores various pieces of information for driving the processor 101. The RF unit 103 is connected with the processor 101 and transmits and/or receives radio signals. The processor 101 implements functions, processes, and/or methods as suggested herein. In the above-described embodiments, the operation of the wireless device may be implemented by the processor 101.

The processor may include an ASIC (application-specific integrated circuit), other chipsets, a logic circuit, and/or a data processing device. The memory may include an ROM (read-only memory), an RAM (random access memory), a flash memory, a memory card, a storage medium, and/or other storage devices. The RF unit may include a baseband circuit for processing radio signals. When an embodiment is implemented in software, the above-described schemes may be realized in modules (processes, or functions) for performing the above-described functions. The modules may be stored in the memory and executed by the processor. The memory may be positioned in or outside the processor and may be connected with the processor via various well-known means.

In the above-described systems, the methods are described with the flowcharts having a series of steps or blocks, but the present invention is not limited to the steps or order. Some steps may be performed simultaneously or in a different order from other steps. It will be understood by one of ordinary skill that the steps in the flowcharts do not exclude each other, and other steps may be included in the flowcharts or some of the steps in the flowcharts may be deleted without affecting the scope of the invention. The present invention may be used in a user equipment, a base station, or other equipment of a wireless mobile communication system.

The present invention may be used in a terminal, a base station, or other equipment of a wireless mobile communication system.

What is claimed is:

1. A method for performing an uplink transmission at a reduced power, the method comprising:
receiving system information from a base station, the system information including information on an operating band and an uplink bandwidth;
receiving a network signal regarding additional power reduction from the base station;
determining a power reduction amount additionally required to reduce interference to a band of a public safety network adjacently positioned to the operating band according to the network signal, when the operating band is within a range of 777 MHz to 787 MHz and the uplink bandwidth is 5 MHz in a range of 777 MHz to 782 MHz; and
performing the uplink transmission at the reduced power based on the determined power reduction amount, wherein a bandwidth of a protection band between the band of the public safety network and the operating band is 1 MHz,
wherein the network signal regarding additional power reduction for the protection band of 1 MHz is different from a signal regarding additional power reduction for another protection band of 2 MHz, and
wherein a power reduction amount determined for the protection band of 1 MHz is larger than a power reduction amount for the another protection band of 2 MHz.

2. The method of claim 1, wherein:
when the band of the public safety network is separated from the operating band by 1 MHz, the band of the public safety network is within the range of 768 MHz to 776 MHz, and
when the band of the public safety network is separated from the operating band by 2 MHz, the band of the public safety network is within a range of 769 MHz to 775 MHz.

3. The method of claim 1, further comprising:
transmitting a scheduling request to the base station; and receiving information on an uplink resource allocated from the base station.

4. The method of claim 3, wherein the power reduction amount determined for the protection band of 1 MHz varies depending on a start position of an uplink resource block indicated by information on the uplink resource and a number of continued resource blocks.

5. The method of claim 1, wherein the network signal for the protection band of 1 MHz is different from NS-07 defined in Third Generation Partnership Project (3GPP).

6. A terminal for performing an uplink transmission at a reduced power, the terminal comprising:
a radio frequency (RF) unit configured to receive system information from a base station, the system information including information on an operating band and an uplink bandwidth, and receive a network signal regarding additional power reduction from the base station; and
a processor configured to:
determine a power reduction amount additionally required to reduce interference to a band of a public safety network adjacently positioned to the operating band according to the network signal when the operating band is within a range of 777 MHz to 787 MHz and the uplink bandwidth is 5 MHz in a range of 777 MHz to 782 MHz, and
control the RF unit to perform the uplink transmission at the reduced power based on the determined power reduction amount,
wherein a bandwidth of a protection band between the band of the public safety network and the operating band is 1 MHz,
wherein the network signal regarding additional power reduction for the protection band of 1 MHz is different from a signal regarding additional power reduction for another protection band of 2 MHz, and
wherein a power reduction amount determined for the protection band of 1 MHz is larger than a power reduction amount for the another protection band of 2 MHz.

7. The terminal of claim 6, wherein:
when the band of the public safety network is separated from the operating band by 1 MHz, the band of the public safety network is within the range of 768 MHz to 776 MHz, and
when the band of the public safety network is separated from the operating band by 2 MHz, the band of the public safety network is within a range of 769 MHz to 775 MHz.

8. The terminal of claim 6, wherein the RF unit transmits a scheduling request to the base station and receives information on an uplink resource allocated from the base station.

9. The terminal of claim 8, wherein the power reduction amount determined for the protection band of 1 MHz varies depending on a start position of an uplink resource block indicated by information on the uplink resource and a number of continued resource blocks.

10. The terminal of claim 6, wherein the network signal for the protection band of 1 MHz is different from NS-07 defined in Third Generation Partnership Project (3GPP).

* * * * *